United States Patent [19]

Flesher et al.

[11] Patent Number: 4,690,971

[45] Date of Patent: Sep. 1, 1987

[54] WATER ABSORBING POLYMERS

[75] Inventors: Peter Flesher; John Clarke; David Marshall, all of West Yorkshire, England

[73] Assignee: Allied Colloids Limited, Great Britain

[21] Appl. No.: 835,602

[22] Filed: Mar. 3, 1986

[30] Foreign Application Priority Data

Mar. 5, 1985 [GB] United Kingdom ............... 8505632
Dec. 13, 1985 [GB] United Kingdom ............... 8530784

[51] Int. Cl.$^4$ .................................................. C08L 33/26
[52] U.S. Cl. ................................. 524/555; 524/556
[58] Field of Search ................................ 524/555, 556

[56] References Cited

U.S. PATENT DOCUMENTS 4,059,552 11/1977 Zweigle ............................... 524/555
4,542,176 9/1985 Graham ............................... 524/556

FOREIGN PATENT DOCUMENTS 1573201 8/1980 United Kingdom .

*Primary Examiner*—Paul R. Michl
*Attorney, Agent, or Firm*—Jenner & Block

[57] ABSTRACT

A slurry or cake is converted to a crumbly state by admixture, in the absence of a polymeric binder, with water swellable, cross-linked, non-sticky, wholly synthetic polymer particles formed of a polymer of acrylic acid (as free acid or water soluble salt) with cross-linking agent and, optionally, acrylamide and/or other monomers.

16 Claims, No Drawings

WATER ABSORBING POLYMERS

It is well known that water absorbent particulate polymeric material will absorb water from its surrounding environment.

In U.S. Pat. No. 3,935,099 it proposed to absorb an aqueous fluid using a water-insoluble alkali salt of an aqueous alkali saponified gelatinised starch-polyacrylonitrile graft polymer which contains gelatinised starch and saponified polyacrylonitrile. One of the many uses alleged in U.S. Pat. No. 3,935,099 for this product is the conversion of sewage sludge to provide a solid which cannot be pumped but can be handled by mechanical means and which can be spread by a manure spreader. Another use described for this product is the formation of a continuous film by drying a layer of a slurry of this product. This shows that the product is film forming. The product is made from gelatinised starch and thus is subject to the variable properties that inevitably follow from the use of a natural polymer such as starch and, in particular, from gelatinisation of it. The polymer will inevitably be a blend of polymer molecules of widely differing properties and will include film forming components, as is demonstrated by the fact that U.S. Pat. No. 3,935,099 describes the formation of films.

Water absorbent, wholly synthetic polymers, are known. For instance very small synthetic polymer particles are described in U.S. Pat. No. 4,059,552.

It is well known to include the polymers in growth media such as sand in order to increase the water absorption of the growth medium. For instance EP No. 1253 describes the use of lightly cross linked non-ionic polyacrylamide particles for this purpose and also discusses prior proposals in which more highly cross linked anionic polyacrylamides have been used. Growth media such as sand or soil are generally in a relatively friable state, even after heavy rain.

In U.S. Pat. No. 3,973,355 it is proposed to use cross linked polymer as a bonding agent to convert plant growth particles into a self-containing, dimensionally stable growth matrix. Thus for instance anionic polyacrylamide is mixed with water to form a gel and is then mixed with the particles of growth medium. The product is then dried under pressure to form the desired dimensionally stable product. Thus an initially friable solid is converted, by the addition of the polymer, to a bonded, shape retaining product.

In GB No. 2,122,218 a water absorbing polyelectrolyte is blended with moist fine particulate material, for example fine coal. It is stated that this is done to improve its handleability and in all the detailed description this is achieved by pelletising the fine coal using both the water absorbing polyelectrolyte and a binder. Thus again a relatively friable solid, moist fine coal, is converted into bonded bodies by a process involving the use of water absorbing polyelectrolyte.

There have been many other disclosures of water absorbing polymers, which may be cross-linked or non-cross-linked and which which may be non-ionic, cationic or anionic.

A major problem exists in that a wet particulate mass tends to stick together and is difficult to handle. There are many situations where it would be very desirable to be able to convert this mass to a crumbled solid. For instance the mass may settle in transport containers, such as railway trucks and be difficult to remove from the containers or it may freeze solid in such containers. It would be desirable to be able to ensure that it was in crumbly state within the containers and so could be removed simply by tipping. Another problem arises in that it is often desired to transport the wet mass pneumatically or to spread it as a solid, and at present both these methods require the use of expensive thermal and other drying techniques.

It was proposed in U.S. Pat. No. 3,935,099 to convert sewage sludge to a crumbly solid using the described gelatinised starch polyacrylonitrile polymer but the final product could not be pumped and the film forming properties of the polymer state that it was inevitably tending to bond solid particles together so that although the free water content was being reduced, to render the product more crumbly, polymeric bonding was also being caused.

In the invention a wet particulate mass that is not crumbly at a predetermined temperature is mixed with water absorbent polymer particles that absorb free water from the mass and the resultant mixture is crumbled at that predetermined temperature and the mixture is free of polymeric binder and the polymer particles are substantially non-sticky when swollen with water and the polymer of the particles is a non-film forming, wholly synthetic, polymer of (a) 5 to 100 mole percent acrylic acid (as free acid or water soluble salts), (b) 0 to 95 mole percent acrylamide, (c) 0 to 50 mole percent other monoethylenically unsaturated monomer selected from non-ionic and anionic monomers and (d) 10 to 10,000 ppm (by weight total monomers) cross linking agent.

In the invention it is essential that the mix should be free of polymeric binder and so there should be no significant or binding amount of a film forming or other polymeric material that will tend to adhere the particles of the initial mass to one another. Thus there should be no deliberate addition of a film forming polymer and the absorbent polymer particles should not carry film forming polymeric binder into the mix.

By using, as the absorbent polymer, a wholly synthetic polymer the inevitable variability in properties associated with gelatinised starch polymers is avoided and it is possible to control the polymerisation reproducibly to obtain the desired swellability and other properties.

The polymerisation conditions and the amount of cross linking agent must be such that the swellable polymer particles are substantially free of polymeric binder and thus are substantially non-sticky. If the particles contain significant amounts of high molecular weight linear polymer they will tend to stick to one another and to the particles of the initial mass. Very small amounts of linear high molecular weight polymer can be tolerated provided they do not render the particles significantly sticky. Low molecular weight products that do not cause stickiness are undesirable but relatively low amounts may be tolerable. Whether or not the particles are substantially non-sticky can easily be determined by experiment. When the particles are swollen by water they must be capable of easily being separated from one another simply by stirring with substantially no tendency to agglomerate into permanent lumps or, particularly, to stick to the particles of the wet particulate mass with which they are to be mixed.

Particularly good results are achieved when the particles have a surface layer that is less swellable than the inner parts of the particles. The desired reduced swellability of the surface layer is preferably obtained by cross linking the surface layer. This tends to reduce the content of linear polymer at any location where it might cause stickiness and it also has the advantage of promoting the uptake of water from the particulate mass and of preventing aggregation of the polymer particles upon addition to the mass.

It is already known to minimize aggregation of swellable polymer particles upon addition to water by providing the particles with a surface layer of reduced swellability, generally by cross linking, and any of these known methods may be used for providing the desired surface layer in the invention.

The desired cross linking can be achieved by contacting the surfaces of the particles with a polyvalent metal salt or other cross linking agent. For instance in U.S. Pat. Nos. 3,114,651 and 3,251,814 particles are treated with a chromic salt. In JP No. 1983/42602 (application No. 1981/140571) an insoluble water absorbent cross linked polymer is dispersed in a medium containing polyvalent metal salt or epihalohydrin. Other methods and materials are described in U.S. Pat. Nos. 4,043,952 and 4,090,013.

Another way of reducing the swellability of the surface layer of the particles comprises coating them with a cationic polymer, such as a polymer of diallyl dimethyl ammonium chloride.

Instead of using any of these conventional cross linking systems we find we can also obtain satisfactory results by applying to the particles a solution in a solvent or solvent blend of sodium aluminate or other aluminate.

As well as optionally having this surface cross-linking the particles must be cross-linked throughout and so cross-linking agent is included in the monomer or monomer blend that is polymerised to form the particles. The amount is generally at least 50 ppm and often at least 100 ppm. It is generally unnecessary for it to be above 1,000 ppm and typical amounts are 200 to 500 ppm. These amounts are the amounts by weight of methylene bis acrylamide, and equivalent amounts of other cross-linking agents may be used. The cross-linking agent may be any of the known ionic or covalent cross-linking agents suitable for copolymerising acrylic monomers, but preferably comprises any of the di- or poly- ethylenically unsaturated monomers conventionally used for cross-linking acrylic polymers. The degree of cross-linking, and the polymer type, should be such that the gel capacity of the polymer (grams deionised water absorbed per gram polymer) is at least twenty-five and generally at least one hundred, preferably at least two hundred. It can be up to five hundred or, very often, up to about seven hundred, but values above about one thousand are undesirable. Values of about three hundred to seven hundred are often best.

Many of the numerous synthetic water absorbing polymers that have been proposed in the past are unsatisfactory for use in the invention. For instance it has generally been considered to have as high a gel capacity as possible and this is generally achieved by very low degrees of cross-linking. High gel capacities result in the swollen beads being too weak to withstand the physical forces applied to them during crumbling of the solid and this is undesirable. High gel capacities also suffer from the disadvantage that they are generally associated with very low degrees of cross-linking and these inevitably lead to the inclusion of film forming polymeric binder with the particles.

The polymer may have been made by, for instance, hydrolysing polyacrylamide but preferably is made by copolymerising the chosen polymers.

The polymer must have at least five percent of its units present as acrylic acid (as free acid or water soluble salt).

One preferred type is a copolymer of 10 to 50 mole percent acrylic acid (as free acid or salt) and 50 to 90 percent acrylamide.

Another preferred type of polymer contains much more acrylic acid, usually 80 to 100 percent acrylic acid with 0 to 20 percent acrylamide, and most preferably is a homopolymer of acrylic acid.

Other monoethylenically unsaturated monomers can be included with the acrylic acid and any acrylamide that is present provided that they are soluble in the monomer blend and do not detract undesirably from the absorption and other properties of the particles. The amount is generally below 20 percent molar, preferably below 10 percent molar and most preferably is zero. Suitable anionic monomers include monoethylenically unsaturated carboxylic acids other than acrylic acid, for instance methacrylic, itaconic or crotonic acid, monoethylenically unsaturated suphonic acids such as 2-acrylamido-2-methylpropane sulphonic acid, and non-ionic monomers such as hydroxyalkyl (meth) acrylates, for instance hydroxy ethyl acrylate. Cationic acrylic monomers may sometimes be included. Other monomers that can be included include any of the monomers containing hydrophobic, preferably polyalkylenoxy hydrophobic, groups as described in EP No. 0172723. Suitable amounts are generally 0.1 to 5 mole percent.

The polymer particles used in the invention are generally made by bulk gel polymerisation followed by drying and comminution in conventional manner, optionally with surface cross linking as described above, but when free flowing characteristics of the polymer particles are important it is preferred for the particles to have been made by bead polymerisation. Thus an aqueous solution of the monomers is dispersed in a non-aqueous liquid to form monomer beads of the desired size, polymerisation occurs within these beads and the resultant suspension is then dehydrated and the beads separated from the non-aqueous liquid. The polymerisation should be conducted with careful control of initiator levels and temperature in order to avoid unwanted linear or low molecular weight polymer formation. If desired the beads may be further comminuted.

The particles will generally have a particle size ranging from 10 microns to 3 mm but are preferably below 500 microns in size in order that a high surface of absorbent is exposed. Best results are generally achieved with products having a particle size of below 200 microns and above 50 microns so as to avoid dusting problems.

One situation in which the invention is of particular value is when a wet particulate mass that may be friable at temperatures above 0° C. but which will freeze to a solid mass below 0° C., due to the presence of surface water on the particles, is converted to a form in which it remains friable upon freezing to below 0° C. by incorporating sufficient of the cross linked polymer particles to remove the surface water. For instance particulate mineral, e.g., a mineral ore such as iron ore or coal, and that has surface water on the particles may be mixed with sufficient of the cross linked polymer to absorb this surface water, with the result that upon freezing the mass it remains as a friable solid. The particles of the mass may be coarse, e.g. above 5 mm.

Another situation in which the invention is of particular value is when the wet particulate mass is a cake or slurry that is not readily friable but which, upon addition of the cross linked polymer, becomes a friable solid. The amount of polymer required to achieve this change will depend upon the amount of water in the initial slurry or cake. The invention is of particular value for the conversion of a slurry to a friable solid, in which event the amount of polymer must be such as to reduce the free water content in the slurry below the critical value at which a continuous phase between the particles can exist.

The amount of polymer that has to be added to convert the product to a crumbly mass will depend upon the particles and the water content in the mass and can easily be optimised. It is generally in the range 0.1 to 5 percent by weight of the wet mass.

The slurries or wet-cakes that are treated in the invention may be inorganic, for instance of sand, china clay, crushed mineral, red mud deposits, phosphate slime or coal, or may be organic, for instance food waste or sewage. The slurry will preferably have a pH above 6.5, especially when the particulate material in the slurry is coal.

After mixing the polymer particles in their substantially dry state with the slurry or cake the particles absorb water from the slurry or cake and at that time or subsequently the resultant mixture is crumbled. This may occur as a result of, for instance, tipping the mixture out of the container or may be effected in order that the particles of the slurry or cake can be transported pneumatically or on a conveyor.

For instance the invention is of particular value for converting red mud deposits or phosphate slime into more easily transportable solids and in preventing wet coal, for instance as mined from a wet seam, from caking in transport waggons.

Following are some examples of the invention.

In Examples 1 to 5 the cross linked polymer is a polymer formed by gel copolymerisation of 60 p.b.w. acrylamide, 40 p.b.w. sodium acrylate and 0.025% methylene bisacrylamide and has a dry particle size of 75 to 500 microns and a gel capacity of 400. In Example 6 the polymer is cross-linked sodium polyacrylate made by gel polymerisation of acrylic acid with about 300 ppm methylene bisacrylamide followed by drying and comminution and reaction, before the gel particles are fully dry, with aluminum isopropoxide followed by further drying. The resultant particles have a size of around 100 microns and a gel capacity of about 600.

EXAMPLE 1

Sewage sludge containing 80% water and 20% sewage solids is mixed with 1% of the cross linked polymer. The resulting product is a crumbly solid which is easily crumbled into powder.

EXAMPLE 2

A wet mass of crushed mineral having a pH of 7 and containing 30% water is mixed with 0.5% of the polymer to produce a friable solid that can easily by transported pneumatically.

EXAMPLE 3

Iron ore carrying a surface film of water, accounting for 20% by weight of the wet iron ore, is mixed with 0.3% of the polymer. When the product is frozen it remains capable of being moved, whereas in a comparative test, without the polymer addition, the product freezes into a solid mass.

EXAMPLE 4

A potato processing plant effluent of approximately 50% water is made handleable as a friable solid by addition of 0.5% of the cross-linked polymer. The product is crumbled and is used as a fertiliser.

EXAMPLE 5

A slurry of filter coal tailings have a particle size of up to about 1 mm and containing about 35 percent water has mixed with it 0.3 percent of the cross-linked polymer. The resultant product is a relatively dry powder that can easily be transported on a conveyor or pneumatically.

EXAMPLE 6

Wet lump coal having a size generally in the range 1 to 5 cm and contaminated with up to 80 percent water is mixed with 0.1 percent of the cross-linked polyacrylate having extra surface cross-linking and is transported in waggons. It is easily tipped out of the waggon as independent lumps but in a comparative test, without the addition of polymer, the lumps tended to solidify in the base of the waggons.

If each of the tests performed in Examples 1 to 5 is repeated using the polymer used in Example 6, even better results will be obtained than are obtained in Examples 1 to 5.

We claim:

1. A process in which a wet particulate mass which is not crumbly at a predetermined temperature is mixed with water absorbent polymer particles that absorb free water from the mass and the resultant mixture is crumbled at the said temperature characterized in that the mixture is free of polymeric binder, the polymer particles have a dry size of 50 micrometers to 3 millimeters and a gel capacity of at least 25, the polymer particles are substantially non-sticky when swollen with water, and the polymer is a non-film forming, wholly synthetic, polymer of (a) 5 to 100 mole percent acrylic acid (as free acid or water soluble salt), (b) 0 to 95 mole percent acrylamide, (c) 0 to 50 mole percent other monoethylenically unsaturated monomers selected from non-ionic and anionic monomers and (d) 10 to 10,000 ppm (by weight total monomers) cross-linking agent.

2. A process according to claim 1 in which the polymer particles have a surface layer of reduced swellability.

3. A process according to claim 1 in which the polymer particles have a surface layer of reduced swellability as a result of surface of the particles having been additionally cross-linked.

4. A process according to claim 1 in which the polymer particles are formed of 80 to 100 percent sodium acrylate and 0 to 20 percent acrylamide.

5. A process according to claim 1 in which the polymer particles are formed of sodium polyacrylate.

6. A process according to claim 1 in which the polymer particles are formed of 10 to 50 percent sodium acrylate and 50 to 90 percent acrylamide.

7. A process according to claim 1 in which the polymer particles have a gel capacity of 100 to 1,000.

8. A process according to claim 1 in which the polymer particles have a dry size of 50 to 500 $\mu$m.

9. A process according to claim 1 in which the wet particulate mass is slurry.

10. A process according to claim 1 in which the crumbled mixture is transported by a method selected from the group consisting of pneumatic transporting, conveyor transporting and tipping from a container.

11. A process in which a wet particulate mass, which will freeze solid and not be crumbly below 0° C., is mixed above 0° C. while in a container with water absorbent polymer particles that absorb free water from the mass and the resultant mixture is crumbled and discharged from the container while below 0° C., characterised in that the mixture is free of polymeric binder, the polymer particles have a dry size of 50 micrometers to 3 millimeters and a gel capacity of at least 25, the polymer particles are substantially non-sticky when swollen with water, and the polymer is a non-film forming, wholly synthetic, polymer of (a) 5 to 100 mole percent acrylic acid (as free acid or water soluble salt), (b) 0 to 95 mole percent acrylamide, (c) 0 to 50 mole percent other monoethylenically unsaturated monomers selected from non-ionic and anionic monomers and (d) 10 to 10,000 ppm (by weight total monomers) cross-linking agent.

12. A process according to claim 11 in which the wet particulate mass is a slurry.

13. A process according to claim 11 in which the crumbled mixture is transported by a method selected from the group consisting of pneumatic transporting, conveyor transporting and tipping from a container.

14. A process in which a wet particulate mass, that is a slurry or a wet cake not readily crumbled, is mixed at a temperature above 0° C. with water absorbent polymer particles that absorb free water from the mass to convert the mass to a crumbly state and the resultant mixture is crumbled at a temperature above 0° C. characterised in that the mixture is free of polymeric binders, the polymer particles have a dry size to 50 micrometers to 3 millimeters and a gel capacity of at least 25, the polymer particles are substantially non-sticky when swollen with water, and the polymer is a non-film forming, wholly synthetic, polymer of (a) 5 to 100 mole percent acrylic acid (as free acid or water soluble salt), (b) 0 to 95 mole percent acrylamide, (c) 0 to 50 mole percent other monoethylenically unsaturated monomers selected from non-ionic and anionic monomers and (d) 10 to 10,000 ppm (by weight total monomers) cross-linking agent.

15. A process according to claim 14 in which the wet particulate mass is a slurry.

16. A process according to claim 14 in which the crumbled mixture is transported by a method selected from the group consisting of pneumatic transporting, conveyor transporting and tipping from a container.

* * * * *